US005782338A

United States Patent [19]

Schuster et al.

[11] Patent Number: 5,782,338

[45] Date of Patent: Jul. 21, 1998

[54] TRANSFER DEVICE FOR MAIL AND THE LIKE

[75] Inventors: Rudolf Schuster, Kirchheim; Josef Raschke, Pliening, both of Germany

[73] Assignee: Siemens Aktiengesellschaft, Munich, Germany

[21] Appl. No.: 666,289

[22] PCT Filed: Nov. 22, 1994

[86] PCT No.: PCT/DE94/01378

§ 371 Date: Aug. 21, 1996

§ 102(e) Date: Aug. 21, 1996

[87] PCT Pub. No.: WO95/17267

PCT Pub. Date: Jun. 29, 1995

[30] Foreign Application Priority Data

Dec. 23, 1993 [DE] Germany ........................ 43 44 347.8

[51] Int. Cl.$^6$ ........................ B65G 47/04

[52] U.S. Cl. ........................ 198/803.13; 198/478.1

[58] Field of Search ........................ 198/803.1, 803.13, 198/478.1, 481.1, 575

[56] References Cited

U.S. PATENT DOCUMENTS

| | | | |
|---|---|---|---|
| 1,952,499 | 3/1934 | Howland et al. | 198/803.1 X |
| 3,031,062 | 4/1962 | Rabinow . | |
| 3,191,748 | 6/1965 | Martin | 198/478.1 X |
| 3,363,741 | 1/1968 | Dierksheide . | |
| 5,123,638 | 6/1992 | Mutov | 198/478.1 X |

FOREIGN PATENT DOCUMENTS

| | | |
|---|---|---|
| 0 101 370 | 2/1984 | European Pat. Off. . |
| 2 431 450 | 2/1980 | France . |
| 2 480 258 | 10/1981 | France . |
| 2 545 802 | 11/1984 | France . |
| 595699 | 4/1934 | Germany . |
| 727653 | 11/1942 | Germany . |
| 31 14718 | 10/1982 | Germany . |
| 253 547 | 1/1988 | Germany . |
| 2 101 066 | 1/1983 | United Kingdom . |
| WO/95/07771 | 3/1995 | WIPO . |

OTHER PUBLICATIONS

Patent Abstracts of Japan, "Stacker For Sheet Counter", Nogi Hiroyoshi, vol. 9, No. 84, JP592123350, Publication Date Jan. 12, 1984.

*Primary Examiner*—James R. Bidwell
*Attorney, Agent, or Firm*—Hill & Simpson

[57] ABSTRACT

A transfer device is provided which includes a rotating paddle wheel (FR) whose preferably fixedly arranged paddles (F) form pockets (Z) which receive the items (S) arriving on a first conveying device (FE1) and discharge the items onto circulating item carriers (ST) of a second conveying device (FE2), the speed (v1) and the spacing (t1) of the incoming items (S), the circumferential speed (u) and the circumferential spacing (t2) of the paddle wheel (FR) and the speed (v3) and the spacing (t3) of the circulating item carriers (ST) being matched to one another. Direct transportation of the items (S) into the pockets (Z) of the paddle wheel (FR) is made possible by segmenting each of the paddles (F) by a plurality of gaps arranged one behind the other in the axial direction, and by interleaving guided segments of the first conveying device (FE1) into the paddle wheel (FR) in the region of the gaps. The transfer of the items (S) to the pockets (Z) can thus be reliably controlled since an ejection operation which is dependent on shape and mass of the items (S) may be eliminated.

20 Claims, 3 Drawing Sheets

TRANSFER DEVICE FOR MAIL AND THE LIKE

BACKGROUND OF THE INVENTION

The present invention generally relates to a sorting or transfer device for moving items such as letters, postcards, packets and the like. More particularly, the present invention relates to an axially-segmented paddle wheel arrangement which is interleaved with a multibelt first conveying device. The paddle wheel receives items delivered from the first conveying device and deposits the items in a predetermined manner on a second conveying device.

The machine-readable post codes which should be specified on items of mail, such as letters, postcards, packets and the like, as an identification for a postal location permit rapid, mechanical distribution of mail. In this arrangement, for example according to U.S. Pat. No. 3,031,062, sorting of the incoming items of mail takes place with the aid of controllable item carriers which are each loaded with an item of mail in special input locations and then discharge said item of mail to a sorting containing, or a corresponding sorting compartment, corresponding the respective post code. Since the sorting containers or sorting compartments may be arranged in various levels, the item carriers circulating on conveying devices must, if appropriate, also be capable of spanning various levels. After transfer of the item of the mail to the assigned sorting container or the assigned sorting compartment, the empty item carriers can then once again be loaded with items of mail when they pass an input location. When the mail is transferred to the abovedescribed sorting apparatus, the items of mail arriving on a conveying device, e.g. a belt conveyor, have to be discharged in a specific manner and, preferably, individually to the item carriers, which pass at relatively high speed.

It is known from GB-A-2 101 066 to provide the paddle wheel with gaps or slots in the paddles, the gaps being spaced along the axial direction and to guide segments of a conveying device into the pockets of the paddle wheel in the region of the gaps.

SUMMARY OF THE INVENTION

The present invention provides an improved sorting or transfer apparatus of a type which is particularly suitable for mail sorting operations.

In an embodiment, the transfer device includes a rotatable paddle wheel with a plurality of axially-aligned paddles between which are defined a plurality of pockets. Each of the paddles has a plurality of radially-extending segments spaced from each other by a plurality of respective gaps. Collectively, these gaps form concentric gaps in the paddle wheel, segmenting the paddle wheel into a plurality of axially-spaced segments. The transfer device also includes a first conveying device which has a plurality of parallel, spaced, endless belts which wrap over a center of said paddle wheel within the respective gaps between the radially extending paddle segments. The paddle wheel is thereby rotatable with the belts in an interleaved manner. The center of the paddle wheel preferably has a plurality of deflection wheels arranged at its center within the gaps, providing a friction surface for the belts of the first conveyor to wind over the paddle wheel axle.

The first conveying device delivers items into the pockets of said paddle wheel. A speed and the spacing of the items on the first conveying device are matched to a circumferential speed of the paddle wheel and the spacing of the pockets.

In an embodiment, a second conveying device is arranged under the paddle wheel for receiving items discharged from the paddle wheel. The second conveying device has a plurality of circulating receptacles for receiving items discharged from the pockets of the paddle wheel. These receptacles may be provided in grouped sections which are linked together. The speed of the second conveying device and spacing of the receptacles of the second conveying device are matched to the circumferential speed of the paddle wheel so that items are properly dispensed in an intended receptacle from a one of the pockets.

In an embodiment, the transfer device includes a first conveying device, a second conveying device with a plurality of circulating item carriers, and a rotatable paddle wheel. The paddle wheel has a plurality of paddles defining a plurality of pockets for receiving items arriving on the first conveying device and discharging the items onto the circulating item carriers of the second conveying device. A speed and the spacing of the incoming items on the first conveying device are matched to a circumferential speed and angular spacing of pockets on the paddle wheel, which are matched to a speed and spacing of the circulating item carriers. Each paddle of the paddle wheel is segmented by a plurality of gaps arranged one behind the other in the axial direction. Cooperatively spaced segments of the first conveying device are guided into the pockets of the paddle wheel in the region of the gaps, and the segments of the first conveying device are guided around coaxially and rotatably arranged deflection wheels of the paddle wheel.

In an embodiment, the paddles are aligned tangentially with respect to a circle which runs concentrically with the wheel axle of the paddle wheel.

In an embodiment, the paddle wheel includes at least one additional paddle. The additional paddle, with an adjacent one of the paddles, defines a void corresponding to regularly occurring void spaces between two groups of item carriers of the second conveying device. This holds an item within a smaller pocket in the paddle wheel to ensure that the item is not dispensed in a space which separates linked groups.

In an embodiment, the transfer device also includes a third or further conveying device arranged to feed the items onto the first conveying device. The further conveying device also has a plurality of spaced, parallel, endless belts. At one end of the further conveying device, its belts are positioned to interleave with the belts at a portion of the first conveying device, forming an overlapping delivery path so that items are moved from the further conveyor onto the first conveyor, for continued movement to the paddle wheel. For a smooth transition between conveyors, the belts of the further conveying device are guided beneath a common conveying plane of the first conveying device and of the further conveying device.

In an embodiment, the paddle wheel and the first conveying device are driven by a common motor.

In an embodiment, guide means are provided for guiding items in the paddle wheel pockets tangentially along said paddle wheel upstream of the second conveying device. Preferably, this guide means is a circulating belt positioned to run generally tangentially to a portion of the paddle wheel at a speed corresponding to the tangential speed of the paddle wheel.

The invention is based on the problem of providing a transfer device for mail which is of a simple construction and by means of which the mail arriving on a conveying device can be discharged in a reliable manner onto circulating item carriers of a sorting apparatus.

Besides transferring mail to a sorting apparatus, the transfer device according to the invention may also be used for comparable tasks. For example, the inventive system may be used in storage systems or automated order-picking systems, in the case of which coded items arriving on a first conveying device and are to be transferred to item carriers of a second conveying device.

The invention is based on the finding that a paddle wheel with preferably fixedly arranged paddles, on the one hand, makes it possible for the items arriving on a first conveying device to be received reliably, and that, on the other hand, specific transfer of the items to the individual item carriers is also ensured by the circumferential speed and circumferential spacing of the paddle wheel being matched to the speed and spacing of the circulating item carriers. For the incoming items to be received reliably in the individual pockets of the paddle wheel, all that is necessary is for the speed and spacing of the incoming items to be matched to the circumferential speed and circumferential spacing of the paddle wheel.

A cooperatively-alternating segmentation of paddle wheel and first conveying device allows an interleaved, overlapping sort of operation which; permits direct transportation of the items into the pockets of the paddle wheel. The transfer of the items from the first conveying device to the pockets of the paddle wheel can thus be reliably controlled since, in particular, an ejection operation which is dependent on the shape and mass of the items can be dispensed with.

The guidance of the segments around the coaxially and rotatably arranged deflection wheels makes it possible for the items to be transported reliably as far as the rear end of the jaw-like pockets of the paddle wheel. The guidance of the segments of the first conveying device via deflection wheels of the paddle wheel, however, necessitates a higher degree of maintenance than does an embodiment in which the first conveying device has segments which project freely into the pockets of the paddle wheel.

An advantageous embodiment of the invention provides a parallel alignment of paddles and first conveying device in the transfer region, with the result that the items can be raised in parallel from the conveying device in an extremely careful manner by the respective paddle. Moreover, the tangential alignment of the paddles permits adaptation of the pockets in the transfer region to an inclination of the circulating item carriers, and thus particularly reliable transfer of the items to the circulating item carriers.

The additional paddles according to an aspect of the invention advantageously permit matching and adaptation of the paddle wheel to the spacing between the item carriers even if gaps are present between individual groups of item carriers. Such gaps result, for example, when a plurality of item carriers are provided on circulating carriages of the second conveying device.

A preferred configuration of the invention permits transportation of the items on the further conveying device at a predetermined spacing as well as transfer of the items to the first conveying device while this spacing is maintained. The spacing of the items can be predetermined, for example, by transversely aligned studs of the further conveying device, the studs then retracting downwards in the region of transfer to the first conveying device. Bending or other forms of mechanical impairment of the items by the studs in the region of the pockets of the paddle wheel is thus avoided.

In an embodiment,the invention provides an advantage of permanently matching the speed of the incoming items to the circumferential speed of the paddle wheel.

The guide means according an embodiment of the invention reliably prevent the items from dropping from the pockets in that circumferential region of the paddle wheel which is located upstream of the discharge region. If the guide means are formed, by an endlessly circulating belt, then the risk of mechanical impairment of the items can be reliably ruled out since the belt runs along automatically and at the same speed.

Additional features and advantages of the present invention are described in, and will be apparent from, the detailed description of the preferred embodiments and from the drawings.

BRIEF DESCRIPTION OF THE PREFERRED EMBODIMENT

Figure 1:
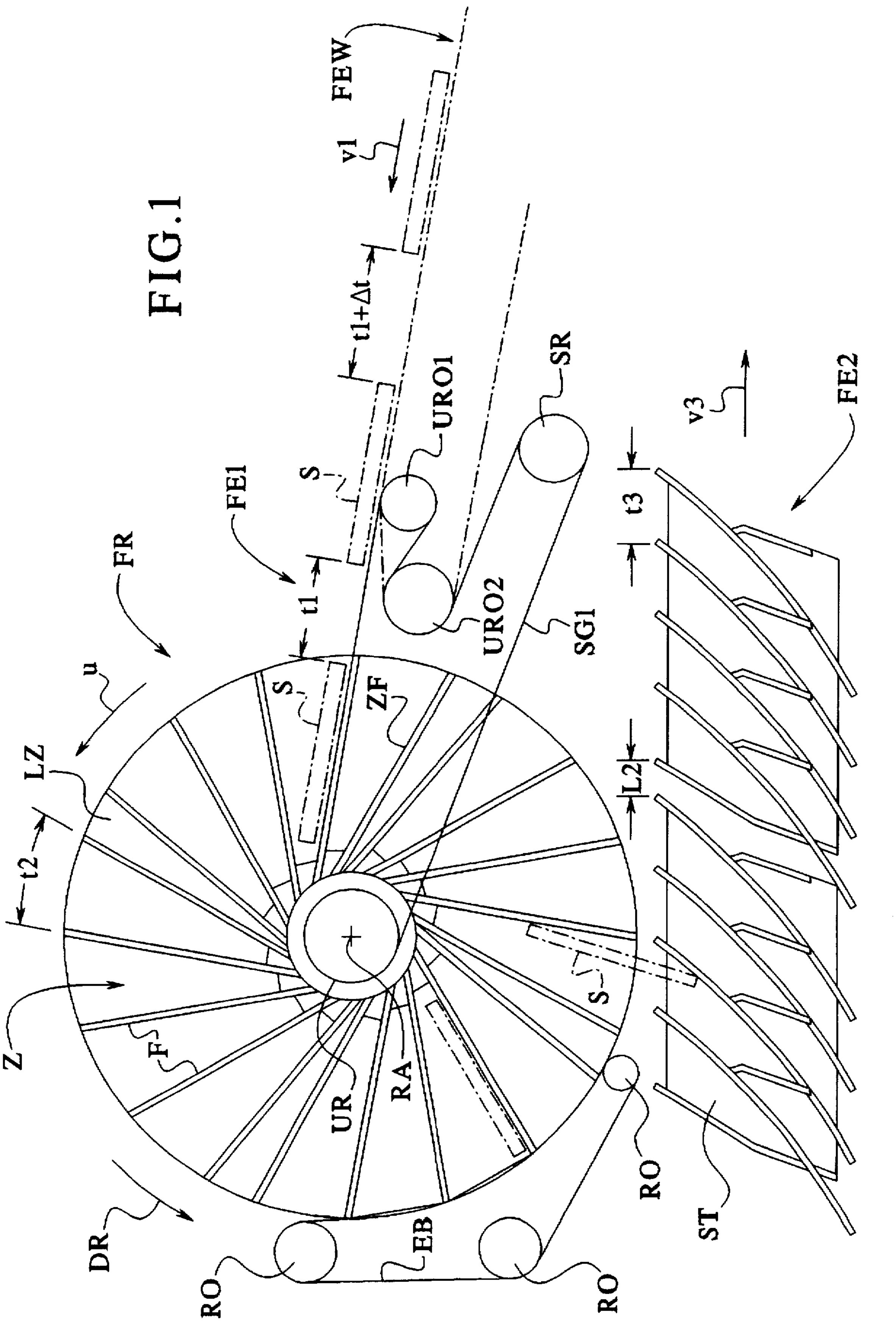
FIG. 1 is a schematic side view of a transfer device for items which is equipped with a paddle wheel.

FIG. 1 shows a considerably simplified schematic representation of a transfer device for items. Said transfer device comprises a rotating paddle wheel FR whose paddles F, arranged fixedly around the wheel axle RA indicated by a cross, form sector-like pockets Z which receive the items arriving on a first conveying device FE1 and discharge said items onto circulating item carriers ST of a second conveying device FE2.

The items S, indicated by chain-dotted lines, are, for example, letters, which are fed from above, at three feed locations, onto a further conveying device FEW, indicated merely by a chain-dotted line. From there, the items S are then transferred to the first conveying device FE1 and transported directly into a pocket Z of the paddle wheel FR. On rotation of the paddle wheel FR in the direction of rotation DR, an endless belt EB then initially prevents the items S from dropping from the pockets Z. The endless belt EB, guided via a total of three rollers RO, is driven in a frictionally locking manner by the paddle wheel FR, as a result of which an undesired relative movement between the endless belt EB and the items S is avoided. Downstream of the endless belt EB, the items S then drop from the pockets Z in the discharge region into the assigned item carriers ST of the second conveying device FE2. The alignment, tangential with respect to an imaginary inner circle of the paddle wheel FR, of the paddles F permits adaptation to the inclination of the item carriers ST in the transfer region.

The item carriers ST of the second conveying device FE2 are components of a sorting apparatus for mail, the construction and mode of operation of which are described, for example, in earlier patent applications P 43 23 564.6 and 43 23 565.4.

The speed v1 and the spacing t1 of the items S arriving on the further conveying device FEW and the first conveying device FE1, the circumferential speed u and the circumferential spacing t2 of the paddle wheel FR and the speed v3 and the spacing t3 of the circulating item carriers ST are matched to one another such that constantly reliable transfer of the items S is always ensured. The speed v1 and the spacing t1 of the incoming items S are selected such that the next empty pocket Z in each case of the paddle wheel FR circulating at constant angular speeds can be loaded. The circumferential spacing t2 of the paddles F of the paddle wheel FR and the spacing t3 of the item carriers ST are matched to one another in the same way as the spacings of a gear wheel and rack which engage with one another. In addition, however, the circumferential speed u of the paddle wheel FR and the speed v3 of the item carriers ST still have to be matched to one another such that the horizontal components of these speeds are the same and the depicted arrangement of the circumferential spacing t2 of the pockets Z in the circumferential region with respect to the spacing t3 of the item carriers ST remains intact.

It can also be seen from FIG. 1 that in each case four item carriers ST are combined in a group, for example a carriage, and that there is a gap L2 between in each case two groups of item carriers ST. For this reason, the paddle wheel FR is equipped with fixedly arranged additional paddles ZF which each form, with the trailing paddle F, as seen in the direction of rotation DR, empty pockets LZ which are assigned to the abovementioned gaps L2 between two groups of item carriers ST. It is also necessary during loading of the further conveying device FEW with items S for the gaps L2 and the empty pockets LZ to be taken into account in that, after four feed operations in each case, the spacing t1 is increased by a corresponding compensatory amount Δt.

Figure 3:
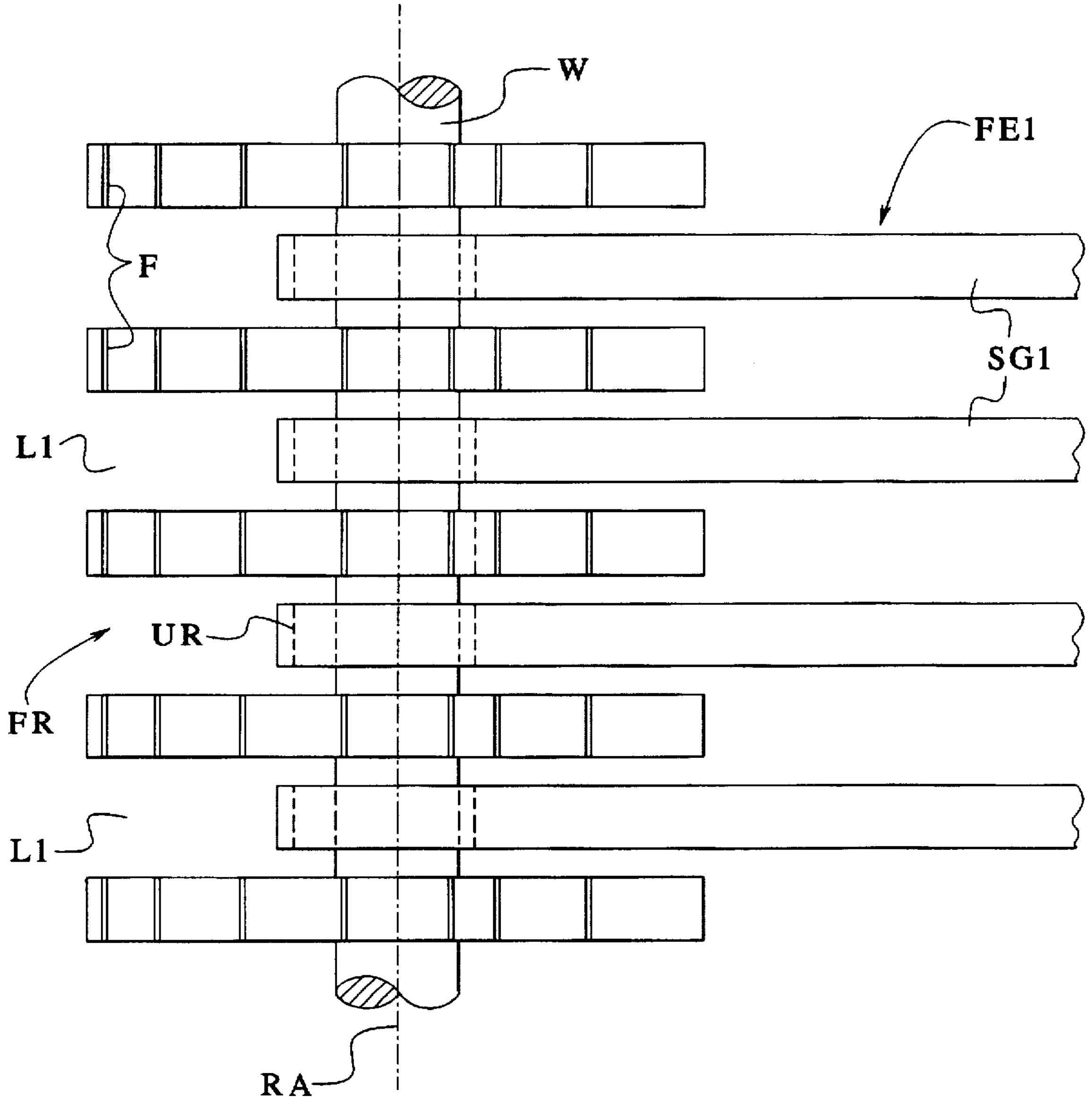
FIG. 3 is a view onto the face of a slotted paddle showing the segmentation of the paddle wheel and the incoming conveying device being guided into the pockets of the paddle wheel.

It can be seen from FIG. 1 that the items S are transported, via the first conveying device FE1, directly into the pockets Z of the paddle wheel FR. This transportation into the rotating paddle wheel FR is made possible by segmentation of paddle wheel FR and first conveying device FE1, and FIG.3 is referred to for details of this. In the case of the segmentation of the paddle wheel FR, which rotates on a shaft W, the individual paddles F exhibit a plurality of gaps arranged one behind the other, as seen in the direction of the wheel axle RA. In the region of the gaps L1, deflection wheels designated by UR are arranged rotatably on the shaft W, the segments, designated by SG1, of the first conveying device being guided around said deflection wheels. The further guidance of the endlessly circulating segments SG1, formed, for example, by flat belts, takes place via a tensioning roller SR and deflection rollers UR01 and UR02. The individual segments of the further conveying device FEW, indicated in FIG. 1 merely by a chain-dotted line, are also guided via said deflection rollers UR01 and UR02.

Figure 2:
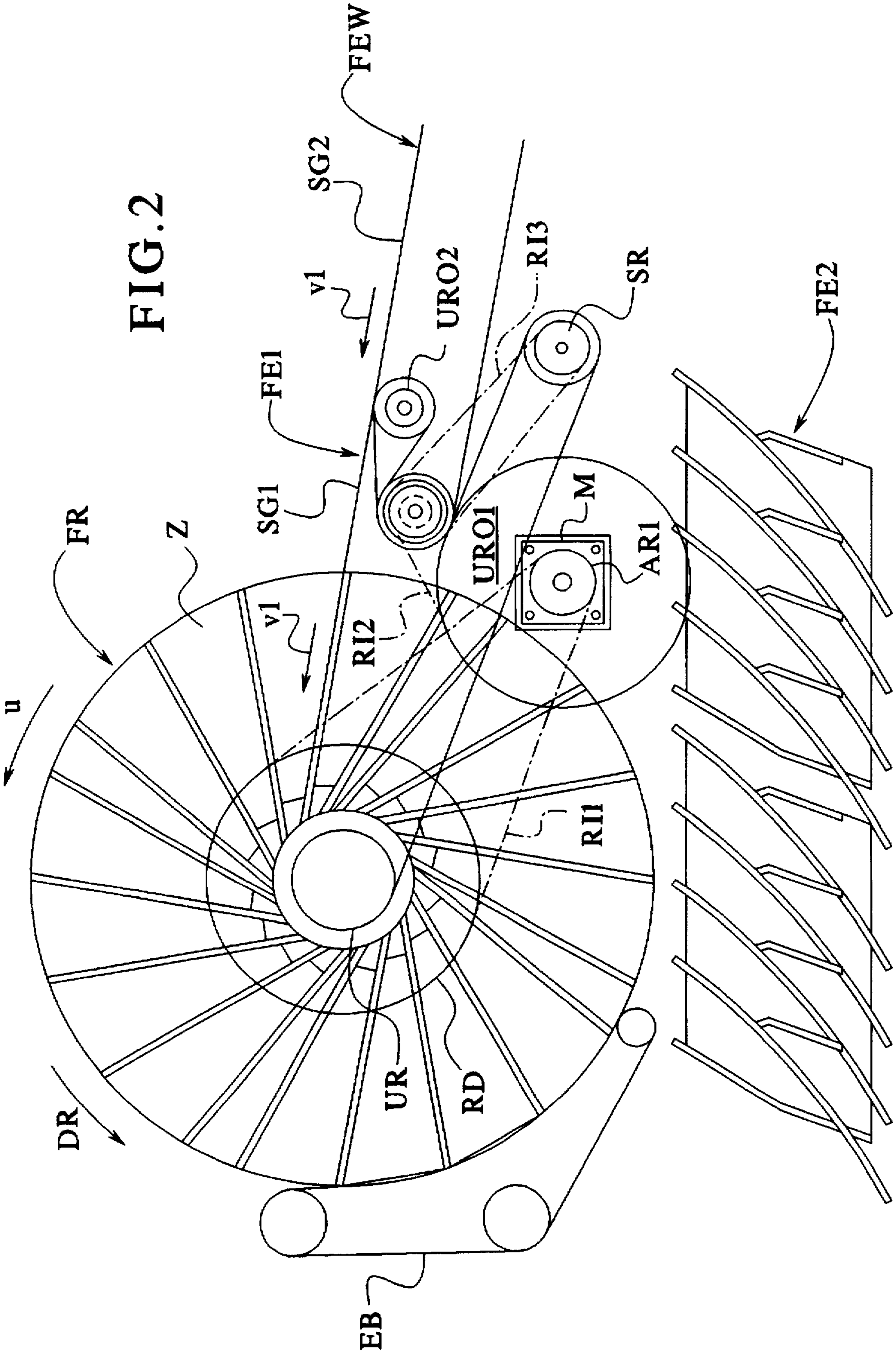
FIG. 2 is a schematic side view of the transfer device according to FIG. 1 with a common drive for paddle wheel and incoming conveying device.

The drive of the paddle wheel FR, of the first conveying device FE1 and of the further conveying device FEW can be seen from FIG. 2. A common motor M drives the shaft W (see FIG. 3) of the paddle wheel FR via a first drive wheel AR1, a belt RI1, indicated by a chain-dotted line, and a wheel RD. Moreover, the motor M drives the deflection roller URO1 via belt RI2, represented by chain-dotted lines, which deflection roller, for its part, drives the tensioning roller SR via a further belt RI3, represented by chain-dotted lines. This drive via the common motor M, on the one hand, ensures that the first conveying device FE1 and the further conveying device FEW are always driven at the same speed v1, and, on the other hand, also ensures that the ratio of this speed v1 to the circumferential speed u or the angular speed of the paddle wheel FR always remains intact.

The guidance of the further conveying device FEW, which is subdivided into segments SG2, via the two deflection rollers URO1 and UR02 permits friction-free transfer of the items S (see FIG. 1) to the first conveying device FE1. It is particularly advantageous here that the transverse studs, which belong to the segments SG2, and are not represented in any more detail in the drawings, but are necessary for maintaining the spacing t1 (see FIG. 1), retract downwards out of the common conveying plane of the conveying devices FE1 and FEW. This retraction of the transverse studs prevents them from bending the items S (see FIG. 1) in the pockets Z of the paddle wheel FR and possibly damaging them.

In the exemplary embodiment represented, the items S (see FIG. 1) arrive at speeds v1=2.15 m/s and at a spacing t1=340 mm. The spacing t1Δt is 510 mm. The paddle wheel FR, which rotates at 20.8 revolutions per minute, has sixteen pockets Z and four empty pockets LZ. The circumferential spacing t2 of the paddle wheel FR is approximately 127 mm. The spacing t3 of the item carriers ST, which rotate at a speed v3=0.625 m/s, is 100 mm, while the gap L2 between two groups of item carriers ST is 50 mm in each case. The segmentation, indicated in FIG. 3, of paddle wheel FR and first conveying device FE1 comprises a total of ten segments of the paddle wheel FR and nine segments SG1 of the first conveying device SE1.

Various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A transfer device for transferring items, the device comprising:

a first conveying device;

a second conveying device having a plurality of circulating item carriers; and a rotatable paddle wheel with a plurality of paddles defining a plurality of pockets to receive items arriving on the first conveying device and discharge said items onto circulating item carriers of the second conveying device;

wherein a speed and the spacing of the incoming items on the first conveying device are matched to a circumferential speed and circumferential spacing of the paddle wheel, which are matched to a speed and spacing of the circulating item carriers; and wherein each paddle of the paddle wheel is segmented by a plurality of gaps arranged one behind the other in the axial direction, wherein cooperatively spaced segments of the first conveying device are guided into the pockets of the paddle wheel in the region of the gaps, and wherein the segments of the first conveying device are guided around coaxially and rotatably arranged deflection wheels of the paddle wheel.

2. The transfer device as claimed in claim 1, wherein the paddles are aligned tangentially with respect to a circle which runs concentrically with the wheel axle of the paddle wheel.

3. The transfer device as claimed in claim 1, wherein the paddle wheel includes one or more fixedly arranged additional paddles to form, together with a trailing paddles, empty pockets respective voids which correspond to regularly occurring void spaces between two groups of item carriers of the second conveying device.

4. The transfer device as claimed in claim 1, further comprising a further conveying device arranged upstream of the first conveying device, the further conveying device also being subdivided into segments, wherein downstream of a transfer location, the segments of the further conveying device are guided beneath a common conveying plane of the first conveying device and of the further conveying device.

5. The transfer device as claimed in claim 1, wherein the paddle wheel and the first conveying device are driven by a common motor.

6. The transfer device as claimed in claim 1, further comprising guide means for guiding the items along a circumferential region of the paddle wheel upstream of a location of transfer of the items to the second conveying device.

7. The transfer device as claimed in claim 6, wherein the guide means are formed by an endlessly circulating belt.

8. A device for transferring items, the device comprising:

a rotatable paddle wheel with a plurality of axially-aligned paddles between which are defined a plurality of pockets, each said paddle having a plurality of radially-extending segments spaced from each other by a plurality of respective gaps; and a first conveying device including a plurality of parallel, spaced, endless belts which wrap over a center of said paddle wheel within the respective gaps between the radially extending paddle segments, the first conveying device delivering items into said pockets of said paddle wheel;

wherein a speed and the spacing of the items on the first conveying device are matched to a circumferential speed of the paddle wheel and the spacing of the pockets.

9. The device according to claim 8, further comprising:

a second conveying device disposed under said paddle wheel for receiving items discharged from said paddle wheel, the second conveying device having a plurality of circulating receptacles for receiving items discharged from the pockets of the paddle wheel;

wherein the speed of the second conveying device and spacing of the receptacles of the second conveying device are matched to the circumferential speed of the paddle wheel.

10. The transfer device as claimed in claim 8, wherein the paddle wheel includes at least one additional paddle defining, with an adjacent paddle, a respective void corresponding to regularly occurring void spaces between two groups of item carriers of the second conveying device.

11. The transfer device as claimed in claim 8, further comprising:

a further conveying device arranged to feed said items onto the first conveying device, the further conveying device also including a plurality of spaced, parallel, endless belts which are positioned to interleaf with the belts at a portion of the first conveying device, the belts of the further conveying device being guided beneath a common conveying plane of the first conveying device and of the further conveying device.

12. The transfer device as claimed in claim 8, wherein the paddle wheel and the first conveying device are driven by a common motor.

13. The transfer device as claimed in claim 8, further comprising:

guide means for guiding items in said paddle wheel pockets tangentially along said paddle wheel upstream of the second conveying device.

14. The transfer device as claimed in claim 13, wherein said guide means includes a circulating belt positioned to run generally tangentially to a portion of the paddle wheel at a speed corresponding to the tangential speed of the paddle wheel.

15. A transfer device for conveying and sorting items, the device comprising:

a paddle wheel having a plurality of paddles between which are defined respective pockets, the paddle wheel having a plurality of segments separated by a plurality of concentric gaps formed collectively in the paddles; and a first conveying device having a plurality of parallel belts spaced to run within said concentric gaps between said segments as the belts wrap over a center of the paddle wheel, so that the paddle wheel is rotatable with the belts in an interleaved manner.

16. The transfer device according to claim 15, wherein the speed of the first conveying device and a spacing of items on the first conveying corresponds to a paddle wheel dimensioning and its rotational speed such that one item is delivered into each pocket.

17. The transfer device according to claim 15, further comprising:

a second conveying device having a plurality of circulating item carriers arranged to respectively receive dispensed items from said pockets;

wherein the second conveying device is disposed below the paddle wheel has a speed corresponding to a tangential speed of the paddle wheel.

18. The transfer device according to claim 15, further comprising a further conveying device comprising a plurality of parallel belts arranged at an upstream end of the first conveying device, the belts of the further conveying device being spaced to alternatingly fit between the belts of the first conveying device so that the items are delivered from the further conveying device onto the first conveying device.

19. The transporting device according to claim 15, further comprising a guide to hold items in the pockets prior to their dispensing into the item carriers.

20. The transporting device according to claim 19, wherein the guide is an endless belt having a portion disposed generally tangentially along the paddle wheel, the belt having a speed corresponding to a tangential speed of the paddle wheel.

* * * * *